United States Patent [19]

Levine

[11] Patent Number: 4,593,217

[45] Date of Patent: Jun. 3, 1986

[54] REVERSIBLE ELECTRIC MOTOR BEARING PLATE ASSEMBLY

[76] Inventor: Fred Levine, P.O. Box 380876, Miami, Fla. 33138

[21] Appl. No.: 278,620

[22] Filed: Jun. 29, 1981

[51] Int. Cl.⁴ .............................................. H02K 5/16
[52] U.S. Cl. ........................................ 310/90; 310/89
[58] Field of Search .............................. 310/85, 89, 90

[56] References Cited

U.S. PATENT DOCUMENTS 3,786,289  1/1974  Baclawski et al. .................... 310/90
3,846,652  11/1974  Lykes ................................. 310/89 X Primary Examiner—Michael L. Gellner
Attorney, Agent, or Firm—Harvey B. Jacobson

[57] ABSTRACT

The bearing plate assembly is removably attached to an end housing of an electric motor in which the end housings of the motor are permanently affixed to the laminated body of the motor by means of anaerobic adhesive. The bearing plate assembly is attached to the end housing by the use of two short thread cutting screws so that it can be quickly and easily removed and replaced. When the bearing plate assembly is removed, the rotor of the motor may be extracted from the housing and reversed so as to reverse the direction of rotation of the motor. The bearing plate assembly is then replaced to complete the reassembly of the motor. By this construction, a motor can be made to run either in a clockwise or counterclockwise direction as desired.

2 Claims, 5 Drawing Figures

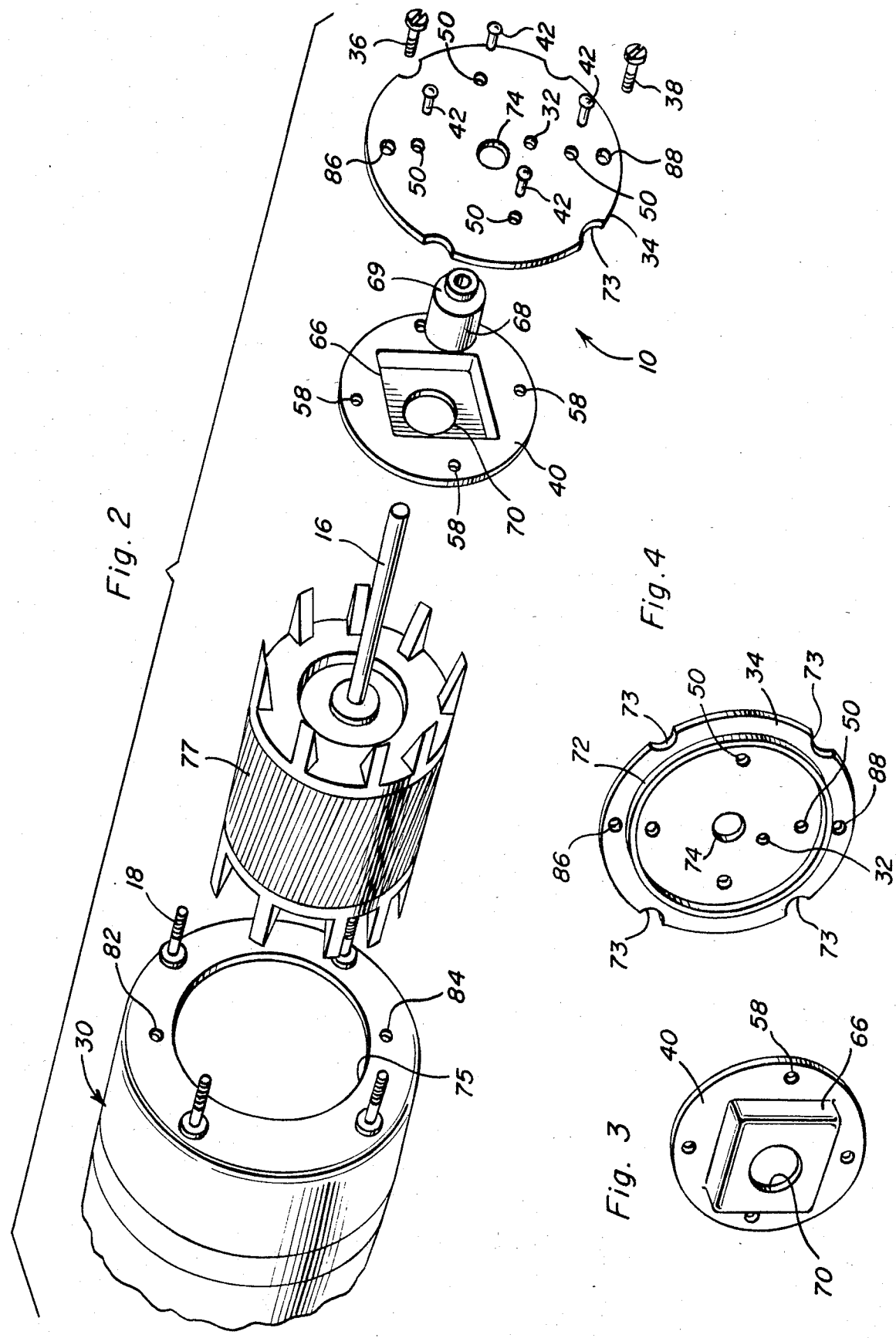

REVERSIBLE ELECTRIC MOTOR BEARING PLATE ASSEMBLY

BACKGROUND OF THE INVENTION

1. Field of the Invention

The present invention generally relates to electric motors and more particularly pertains to an electric motor end housing which has a quickly detachable bearing plate assembly to enable the rotor to be reversed by rotating it end for end, so as to provide an electric motor which may be run in either a clockwise or counterclockwise direction.

2. Description of the Prior Art

In the field of refrigeration, it is quite common to use a plurality of electric motors within a particular refrigeration system that by necessity must either rotate in a clockwise or counterclockwise direction. Accordingly, during periodic system malfunctions, a repairman is often faced with the problem of having to replace a motor which rotates in either one or the other of the aforementioned directions. As such, it is necessary that a repairman always carry with him a supply of both clockwise and counterclockwise rotating motors, inasmuch as motors are normally designed to rotate in only one direction. By the same token, it should be noted that the motors may be identically constructed, with the direction of rotation of the motor being controlled by the positioning of the rotor within the motor housing. Specifically, certain motors that rotate in a clockwise direction may be made to rotate in a counterclockwise direction simply by reversing their rotors within their housings. This reversal is accomplished by axially extracting the rotor from the housing and then reversing the rotor by turning it end for end and reinserting it.

While it would normally appear to be an easy operation to reverse an electric motor rotor for the purpose of reversing the motor's direction of rotation, problems exist in accomplishing such a reversal due to the construction of the motor. Specifically, commercially available motors provided for driving fans and the like in refrigeration systems have housings which are assembled in such a manner that the rotor cannot be reversed without destroying the housing.

There has been at least one attempt to design a motor which would employ the use of a reversible rotor, thus to provide a motor that may be driven in either a clockwise or counterclockwise direction. In this regard, U.S. Pat. No. 4,224,544, issued to McKinnon et al on Sept. 23, 1980, discloses a fan motor having a reversible rotor. However, the McKinnon et al motor is a C-frame motor which requires that a plurality of retaining members and brackets must be removed from an end portion of the electric motor, before the rotor can be removed therefrom for the purpose of axial reversal. Accordingly, it can be appreciated that there still exists a need for a new and improved reversible fan motor which would permit quick and easy rotor reversal and in this respect, the present invention substantially fulfills this need.

SUMMARY OF THE INVENTION

An object of the present invention, which will be described subsequently in greater detail, is to provide a new and improved reversible electric motor bearing plate assembly that includes a bearing plate with a bearing cup centrally positioned on the interior thereof in a manner which supports a bearing and oil soaked felt within the bearing cup. The bearing plate is attached to an end housing of an electric motor by the use of two short thread cutting screws whereby the entire bearing plate assembly may be quickly and easily removed from and replaced on the end housing. When the assembly is removed, the motor rotor may be extracted, reversed and reinserted in the motor housing to effect the desired rotation reversal. As such, the direction of rotation of the electric motor is accomplished in one quick and easy action.

It is another object of the present invention to provide a reversible electric motor bearing plate assembly which may be easily and economically manufactured, which is simple in construction and which utilizes no moving parts, which is reliable and efficient in its design, and which is durable and rugged in its construction.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an exploded perspective view illustrating the various parts of the reversible electric motor.

FIG. 3 is a detail perspective view illustrating the construction of the bearing cup forming a part of the present invention.

FIG. 4 is a detail perspective view illustrating the construction of the bearing plate forming a part of the present invention.

DESCRIPTION OF THE PREFERRED EMBODIMENT

Figure 1:
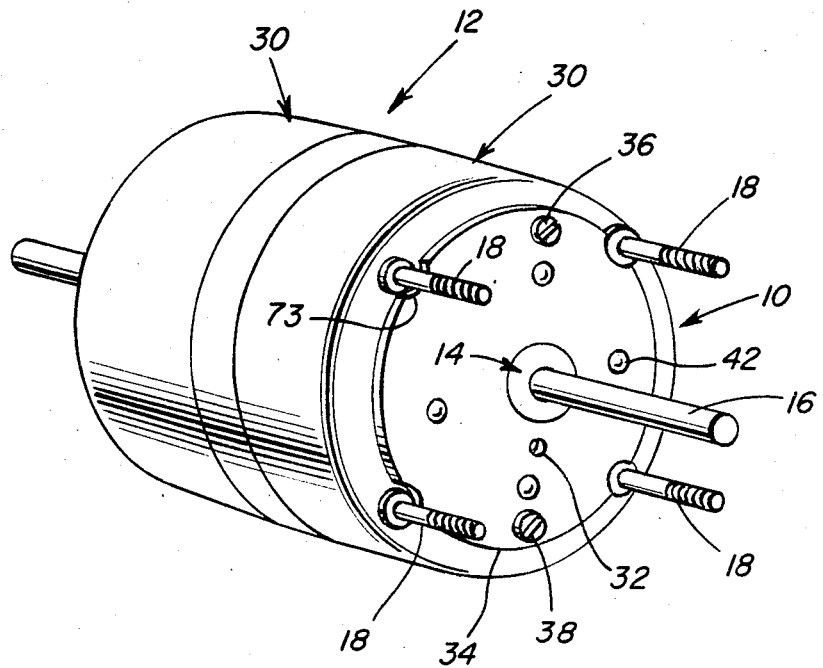
FIG. 1 is a perspective view of the reversible electric motor end housing and detachable bearing plate assembly of this invention.

With reference now to FIG. 1 of the drawings, a reversible electric motor bearing plate assembly embodying the principles and concepts of the present invention and generally designated by the reference numeral 10 will be described. In this respect, it can be seen that a reversible electric motor bearing plate assembly 10 is attachable to an end housing 30 of an electric motor 12 and supports a bearing 14 in which the rotor shaft 16 is journaled. The end housings 30 are held in place on the laminated body in a conventional manner by using anaerobic adhesive. As shown, the electric motor 12 conventionally includes a plurality of longitudinally extending, long, threaded studs 18 which are pressed into the end housing 30 from the inside for mounting the motor to a wall or bracket. Any surplus studs can be removed by bending back and forth with pliers or the like until they snap off. Further illustrated in FIG. 1 is the positioning of an oil hole 32 on the bearing plate 34 which forms part of the bearing plate assembly 10. Additionally, bearing plate assembly attachment screws 36, 38 are shown as the operative means of connecting the bearing plate assembly 10 to the end housing 30 of the electric motor 12.

With reference next to FIG. 2 of the drawings, it can be seen that the bearing plate assembly 10 includes both the aforementioned bearing plate 34 and a bearing cup 40 mountable thereto through the use of a plurality of attachment rivets or eyelets 42, positionable through the respective apertures 50, in the bearing plate 34, and also through the apertures 58, in the bearing cup 40. As such, the rivets or eyelets 42 serve to hold the bearing plate 34 and the bearing cup 40 in a fixed relationship.

As to the construction of the bearing cup 40, it can be seen that the same is provided with a substantially square-shaped indentation or bearing recess 66 into which is positionable a conventional rotor support bearing or bushing 68. In this regard, the recess 66 has a large centrally positioned aperture 70 which serves to support and align the bearing 68 within the bearing recess 66. The other end of the bearing 68 has a reduced diameter shoulder 69 press fitted into an opening 74 in the bearing plate 34.

FIGS. 3 and 4 have been provided to more specifically illustrate the constructional details of the bearing cup 40 and the bearing plate 34. In this regard, it can be seen that the bearing recess 66 formed in the bearing cup 40 is of such a design as to be die cast zinc to facilitate manufacture thereof. The bearing plate 34 is shown as being provided with a circular ridge 72 which is integrally formed on the inner surface thereof and which is concentrically positioned relative to the aperture 74 which is centrally positioned in the plate 34. The ridge 72 is concentric with and closely receives the bearing cup 40 and the ridge 72 is closely received by the open center 75 in end housing 30 to support the weight and radial thrust of the rotor when assembled so that the screws 36, 38 only support horizontal thrust. A pair of guides may be provided on the bearing plate to be received in recesses in the end housing 30. Further, it can be seen that the bearing plate 34 is provided with a plurality of notches or cutouts 73 in the periphery thereof, which serve to permit passage of the threaded studs 18, as shown in FIG. 1.

Figure 5:
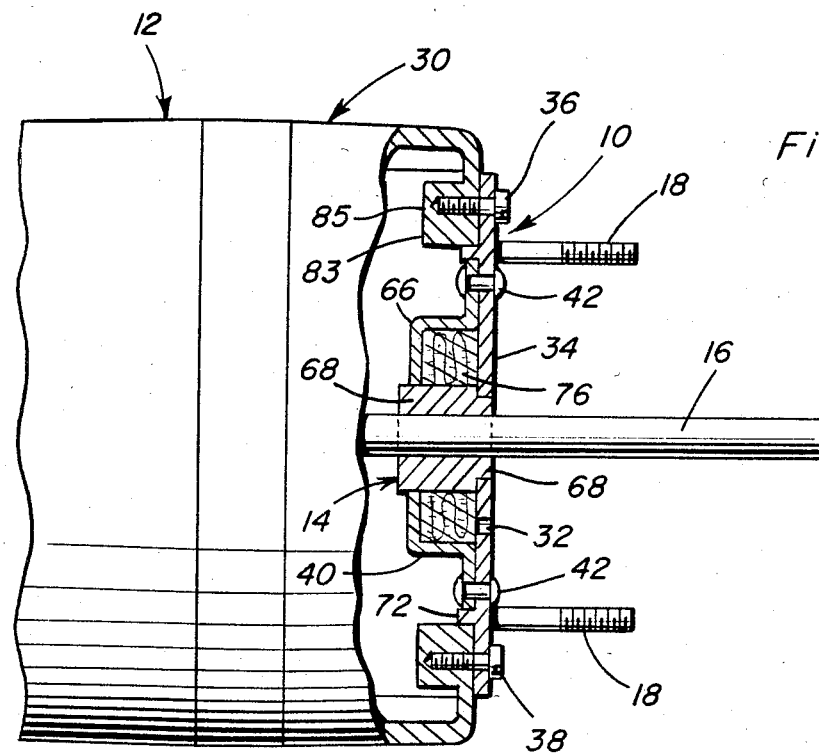
FIG. 5 is a fragmental sectional view illustrating the association of the components of the present invention.

To understand the manner of use of the present invention, reference is made to FIG. 5 of the drawings wherein the assembled relationship of the components is shown with portions of the motor omitted. The bearing plate 34 is operably attached to the bearing cup 40 through the use of the aforementioned rivet or eyelets 42. The bearing recess 66 is provided with oil soaked felt 76 which surrounds and lubricates the bearing 68. Once the bearing plate assembly 10 is in position as illustrated, attachment screws 36, 38 may be employed to effectively attach the assembly to the end housing 30. In this respect, the end housing 30 of the motor has apertures 82, 84, as best shown in FIG. 2, while the bearing plate 34 is provided with respective alignable apertures 86, 88 through which the respective thread cutting sheet metal screws 36, 38 may be directed for effecting a detachable connection of the bearing plate assembly 10 to the end housing 30. As shown, the apertures 82, 84 include a pocket structure 83 having a closed inner end 85 so that any metal shavings formed when inserting the thread cutting screws 36, 38 will not fall into the working parts of the motor.

As such, assuming that the electric motor illustrated in FIG. 1 is rotating in one direction, a user of the motor desiring to reverse the direction of rotation of the rotor 77 and its associated rotor shaft 16 need only to remove the attachment screws 36, 38 and then slide the bearing plate assembly 10 outwardly from the end housing 30 until the same disengages from the rotor shaft. The rotor 77 may then be withdrawn from the end housing 30 and axially reversed, whereby the ends of the rotor shaft 16 are now positioned at the opposite ends of the motor. The bearing plate assembly 10 may then be slid back over the rotor shaft 16 and the screws 36, 38 may be utilized to reconnect the bearing plate assembly to the end housing 30. As such, through a reversal of the rotor 77, the direction of rotation of the motor 12 has been reversed in one quick and simple operation.

With respect to the above description then, it should be realized that the optimum dimensional relationships of the parts for the invention are deemed readily apparent and obvious to one who is skilled in the art to which the invention pertains, and all equivalent relationships to those illustrated in the drawings and described in the specification, to include modification of form, size, arrangement of parts and details of operation, are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An electric motor bearing plate assembly designed to permit a quick and easy reversal of an electric motor rotor, said bearing plate assembly comprising:

bearing plate means attachable to an end housing of an electric motor;

bearing cup means operably attachable to said bearing plate means and serving to support a bearing operably associated with the rotor shaft of an electric motor; and hand tool operable attachment means for removable attachment of said bearing plate assembly to an electric motor, said bearing plate means including a generally flat plate, said attachment means including screw threaded means securing the plate to an end housing of the electric motor, said bearing cup means including a bearing cup, means securing the bearing cup to the interior of the bearing plate, said bearing plate and bearing cup including a centrally located aperture, a bearing mounted on and between said bearing plate and bearing cup in permanent alignment with the apertures for rotatably journaling a rotor shaft extending therethrough and a rim on the interior of the bearing plate engaging the interior periphery of a large opening in the end housing of the motor to maintain concentricity between the motor housing and stator therein and the rotor shaft and rotor thereon to maintain a proper air gap between the rotor and stator, said screw threaded means only resisting thrust along the rotational axis of the rotor shaft with the rim transferring radial load of the rotor shaft to the end housing of the motor and accurately positioning the bearing plate means with respect to the end housing when mounted thereon.

2. An assembly to enable the rotational direction of the rotor shaft of a small electric motor to be reversed at the site of a motor replacement by a repair person by using normally available hand tools thereby eliminating the necessity of the repair person having replacement motors available with clockwise and counterclockwise rotating rotor shafts in which said motors conventionally are constructed so that the rotational direction of the rotor shaft cannot be reversed without destroying the housing, said assembly comprising an end housing forming part of the motor and including an opening sufficiently large to enable the rotor and shaft to move axially therethrough, a bearing plate assembly having a shaft bearing supported thereon for journaling the rotor shaft, and means operative by hand tools to removably secure the bearing plate assembly to the end housing thereby enabling removal of the bearing plate assembly, removal of the rotor and shaft, reversal of the rotor and shaft and reinsertion thereof and reattachment of the bearing plate assembly to the end housing, said end housing and bearing plate assembly including coacting means retaining the bearing plate assembly and rotor shaft and rotor in accurate relationship to the motor end housing when reattached, said means operative by hand tools being a plurality of screws connecting the periphery of the bearing plate assembly to the end housing adjacent the periphery of the opening therein whereby the bearing plate assembly forms a closure for said opening whereby the direction of rotation of the motor may be reversed by using only a screwdriver, said coacting means including an inwardly directed flange on the end housing defining the opening with the edge thereof concentric with the end housing and the rotor and rotor shaft, and an annular ridge on the inner surface of the bearing plate assembly concentric with the rotor and rotor shaft and telescoped closely into the edge of the opening to accurately position the rotor and maintain a proper air gap between the rotor and stator of the motor.

* * * * *